United States Patent
Turner

[11] Patent Number: 5,912,538
[45] Date of Patent: Jun. 15, 1999

[54] TORQUE AMPLIFICATION FOR ICE BREAKING IN AN ELECTRIC TORQUE MOTOR

[75] Inventor: David Turner, Bloomfield Hills, Mich.

[73] Assignee: Eaton Corporation, Cleveland, Ohio

[21] Appl. No.: 09/076,352

[22] Filed: May 12, 1998

[51] Int. Cl.$^6$ ...................................................... H02P 1/00
[52] U.S. Cl. .......................... 318/280; 318/282; 318/606; 318/286
[58] Field of Search ................................... 318/280, 282, 318/606, 286

[56] References Cited

U.S. PATENT DOCUMENTS 4,715,469 12/1987 Yasuda et al. ....................... 318/280 X

*Primary Examiner*—Karen Masih
*Attorney, Agent, or Firm*—Fay, Sharpe, Beall, Fagan, Minnich & McKee

[57] ABSTRACT

A method of amplifying the torque output by an electric torque motor (10) of a system such as a vehicle electronic throttle control system. Upon the formation of ice on and around the throttle plate (T) of an electronic throttle system, the torque output by the torque motor (10) connected to rotate the throttle plate (T) is amplified from a normal operating torque to an amplified torque sufficient to overcome the ice or other obstruction. The method includes applying either a clockwise or counter-clockwise direction torque to the rotor (38) of the torque motor (10) to twist the output shaft (34) connected to the stuck throttle plate (T). The torque applied to the rotor (38) is then reversed so that the other of the clockwise and counter-clockwise direction of torque is applied to the rotor (38). The foregoing torque-application steps are repeated in succession at a select frequency equal to the natural frequency of the mechanical system of which the motor (10) and throttle plate (T) are parts. As such, a resonant condition is established and the torque applied to the rotor (38) is amplified to a level sufficient to overcome the ice or other obstruction. A torque motor system is provided to implement the torque amplification method.

11 Claims, 3 Drawing Sheets

TORQUE AMPLIFICATION FOR ICE BREAKING IN AN ELECTRIC TORQUE MOTOR

BACKGROUND OF THE INVENTION

The present invention relates to motors of the fractional revolution type or torque motors as they are commonly called. Motors of this type typically provide angular displacement or movement of the rotor based on an applied electrical signal as, for example, angular rotor movement proportional to the applied voltage or level of current flow through the motor winding. However, the invention may have broader applications wherever a particular vibration is advantageously used to assure a desired movement.

Torque motors have found widespread application in control systems where it is desired to rotate a shaft or member to a specific position or to apply a specified amount of torque to a shaft in response to an electrical control signal. In particular, in the auto industry, torque motors have been utilized to control the position of an internal combustion engine air inlet throttle valve by an electrical signal instead of directly by user movement of a mechanical throttle linkage attached to the throttle valve. The desirability of electrical engine throttle valve control has arisen in certain motor vehicle applications where it is desired to provide cruise control and/or override the user input to the throttle position control mechanism in response to the vehicle encountering extreme driving conditions or emergency situations. For example, where an anti-lock brake or traction control system is employed on the vehicle, it is desired under certain conditions to have the electronic control system intervene to determine the throttle valve position rather than the user inputs to the accelerator pedal control. Accordingly, it is expected that demand for electrical valve control will continue to increase and use of mechanical linkages will wane.

Under certain motor vehicle operating conditions, it is possible for ice to form on and around the throttle plate valve of a motor vehicle electronic throttle control. In such situations, movement of the throttle plate in response to torque applied by the torque motor is prevented. Of course, safe and effective vehicle operation is not possible under such conditions. With prior, purely mechanical throttle plate position control linkages, an operator of the vehicle was able to overcome the ice simply by application of increased force on the accelerator pedal. In addition to ice, with the close manufacturing tolerances used in vehicle electronic throttle assemblies, it is possible that dirt or other debris may jam the throttle plate and prevent movement under the control of the subject torque motor.

Heretofore, the solution to these problems has been to use a torque motor having a sufficiently high torque output that ice and other obstructions can be overcome by the motor without difficulty. Unfortunately, use of large, high-output torque motors is not efficient in terms of motor cost and space requirements. For example, the required operational torque for electronic throttle operation under "normal" conditions (with no icing or other obstruction) is approximately 25% of the torque output by these prior motors, i.e., prior motors have been selected for electronic throttle control based upon "ice breaking" rather than typical operational requirements.

In light of the foregoing, it is now desirable to develop a torque motor system and method of operation for use in an electronic throttle control system or other mechanical system that allows a torque motor to be selected based upon the normal operating torque output required from the motor and not ice breaking or other obstruction clearing requirements. Use of such motors rather than larger, higher-output motors would reduce manufacturing cost, motor space requirements, and facilitate use as a high-volume motor vehicle component and other usage.

BRIEF SUMMARY OF THE INVENTION

In accordance with a first aspect of the present invention, a method of amplifying the torque output by an electric torque motor of a mechanical system is provided. The torque is amplified from a normal operating torque to an amplified torque sufficient to overcome an obstruction preventing movement of a rotor of the torque motor. The subject method includes applying one of a clockwise and a counter-clockwise direction torque to the rotor of the torque motor. The torque applied to the rotor is then reversed so that the other of the clockwise and counter-clockwise direction of torque is applied to the rotor. The foregoing torque-application steps are repeated in succession at a select frequency equal to the natural frequency of the mechanical system of which the motor is a part. As such, the torque applied to the rotor is amplified by resonance to a level sufficient to overcome the ice or other obstruction.

In accordance with another aspect of the present invention, a method of overcoming an obstruction preventing movement of a throttle plate connected to a rotor of an electric torque motor in a mechanical system is provided and includes amplifying the operational torque of the motor. The method comprises applying torque to the rotor in first and second opposite directions successively at a select frequency to oscillate the rotor at the natural frequency of the mechanical system until the torque output of the motor is amplified by resonance to overcome the obstruction.

In accordance with a further aspect of the present invention, a torque motor system includes a stator having a plurality of pole segments, a coil of electrically conductive material wound on each of the plurality of stator pole segments, and a rotor formed of magnetically permeable material positioned to rotate relative to the stator and including permanently magnetized material defining magnetized poles. Upon select energization of the coils, electromagnetically induced torque is applied to the rotor to rotate the rotor and components of the mechanical system connected to rotate with the rotor. A microprocessor-based control system is provided for selectively energizing the coils in accordance with a stored control program. The control system selectively energizes the coils so that torque is applied to the rotor in first and second opposite directions successively at a torque amplification frequency approximately equal to a natural frequency of the mechanical system.

One advantage of the present invention is the provision of a method of amplifying the torque output of a torque motor to overcome an obstruction preventing movement of a member connected to rotate with the rotor of the torque motor.

Another advantage of the present invention is found in the provision of a method of controlling a torque motor of a vehicle electronic throttle control system to overcome ice or another obstruction preventing movement of a throttle plate connected to rotate with the rotor of the torque motor.

Still another advantage of the invention is that it allows for use of smaller, less expensive torque motors in electronic throttle control and other applications that have heretofore required larger, more expensive motors to overcome obstructions of components connected to the rotor.

Still other benefits and advantages will become apparent to those of ordinary skill in the art upon reading and understanding the following specification.

BRIEF DESCRIPTION OF THE DRAWINGS

The invention may take form in certain parts and arrangements of parts, and in certain steps and arrangements of steps, preferred embodiments of which are illustrated herein. The drawings are only for purposes of illustrating preferred embodiments and are not to be construed as limiting the invention.

DETAILED DESCRIPTION OF THE INVENTION

Figure 1:
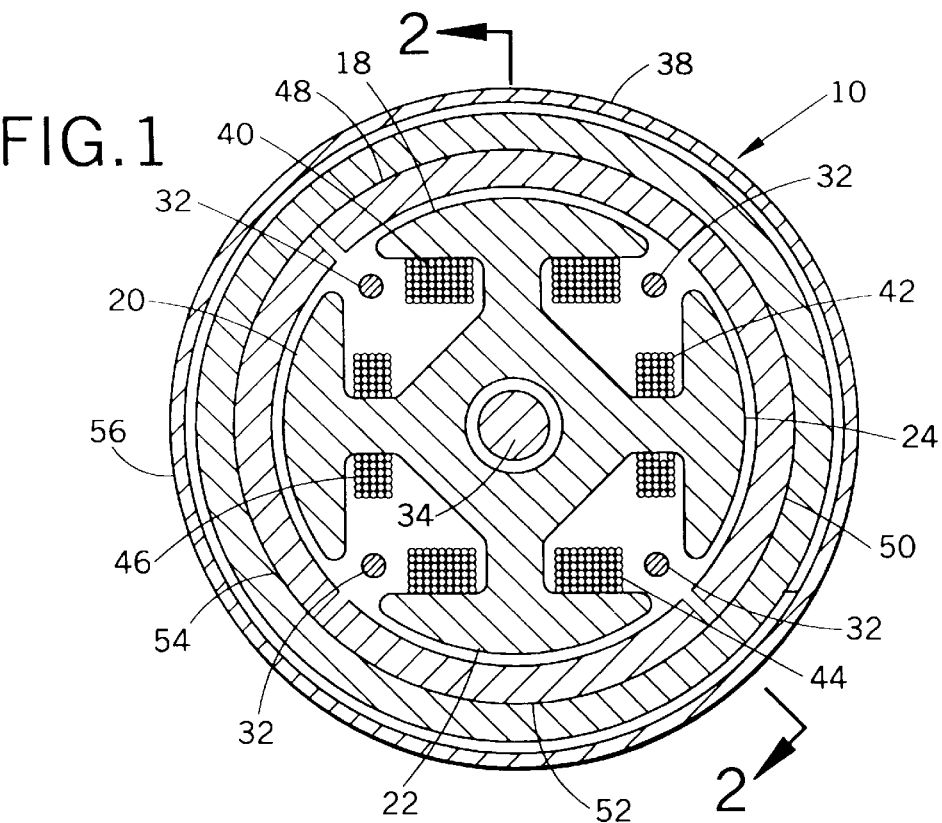
FIG. 1 is a transverse cross-section of a torque motor of the type used to control a throttle plate in an electronic throttle control system.
Figure 2:
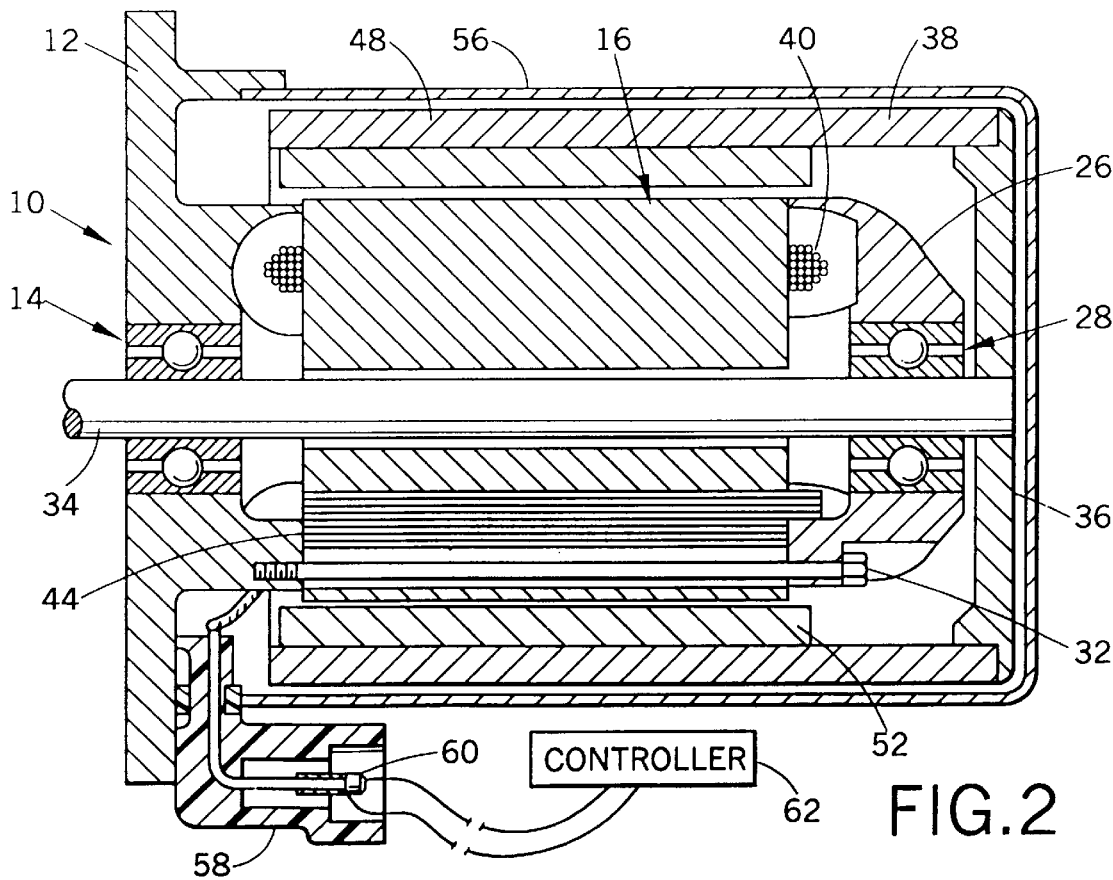
FIG. 2 is a sectional view taken along section lines 2—2 of FIG. 1.

FIGS. 1 and 2 illustrate one suitable torque motor 10 of the type used to control the position of a throttle plate in a vehicle electronic throttle control system. The invention will be explained with reference to the motor 10, but those of ordinary skill in the art will recognize that the present invention is not limited to any particular torque motor, and other torque motors may be used in accordance with the present invention. Another suitable torque motor is described in a commonly assigned and co-pending U.S. patent application entitled "Torque Motor and Drive Circuit" in the name of David Turner filed on even date herewith by U.S. Express Mail.

The motor 10 includes a base member 12 which has disposed therein a first bearing 14 illustrated as a ball bearing. A stator member 16 has four pole segments 18, 20, 22, 24, and one end thereof registered against the base 12 in cantilever arrangement. A retaining member or spider cap 26 has a second bearing indicated generally at 28 received therein. The member 26 is registered against the free end of stator 16 and is secured by bolts 32. An output shaft 34 is journaled through bearings 14, 23 and extends outwardly from the bearings. The end of the output shaft adjacent bearing 28 has securely attached thereto, such as by metal deformation or weldment, the closed end 36 of a generally cup-shaped rotor 38 which is nested over the stator 16. As such, the output shaft 34 rotates with the rotor.

The stator 16 has a coil of continuous conductive material, such as magnet wire, wound around each of the stator pole segments as denoted by reference numerals 40, 42, 44, 46. A plurality of permanent magnets are disposed about the inner periphery of the rotor cylinder 38 as denoted by reference numerals 48, 50, 52, 54. Each of the magnets has its poles oriented in a radial direction. In the preferred arrangement, the magnetic poles are formed by four discrete magnets.

With continuing reference to FIGS. 1 and 2, a housing or cover 56 having a generally cup-shaped configuration is received over the rotor and attached to the base 12 by any suitable expedient. An electrical receptacle 58 is disposed on the base 12 and includes a pair of electrical terminal pins illustrated and denoted generally by reference numeral 60. It will be understood that the pins are each connected to one end of the windings of each of the coils 40 through 46. Furthermore, the flow of current through the windings 40–46 is controlled by an electronic control system 62 operatively connected to the motor via the plug 58. As is discussed in further detail below, the control system 62 controls the flow of electrical current through the windings 40–46 to control the position of the rotor relative to the stator.

The illustrated motor 10 is capable of providing a maximum of $\pm\Pi/4$ radians of rotation with an overall length of 80 mm with an overall diameter of 62 mm and with 60 turns of number 20 gauge (0.79 mm) magnet wire wound on each stator segment. The ability of the motor 10 to rotate the rotor 38 bi-directionally, i.e., in either a "clockwise" or "counter-clockwise" direction is required in order to function in accordance with the present invention. It has been found satisfactory to provide an air gap distance of about 0.5–1.0 mm radially between the stator segments 18–24 and the inner periphery of magnets 46–52. For a motor having a stator length of 60 mm, a 0.75 mm air gap distance has proven satisfactory. Preferably, the stator coils are wound of copper magnet wire; however, it will be understood that aluminum or other materials may be employed if desired. It will also be understood that the torque motor 10 may be made with other combinations of stator and wire size and number of turns for the coils, and, the motor may be made to other sizes and configurations than the particular dimensions recited.

Figure 3:
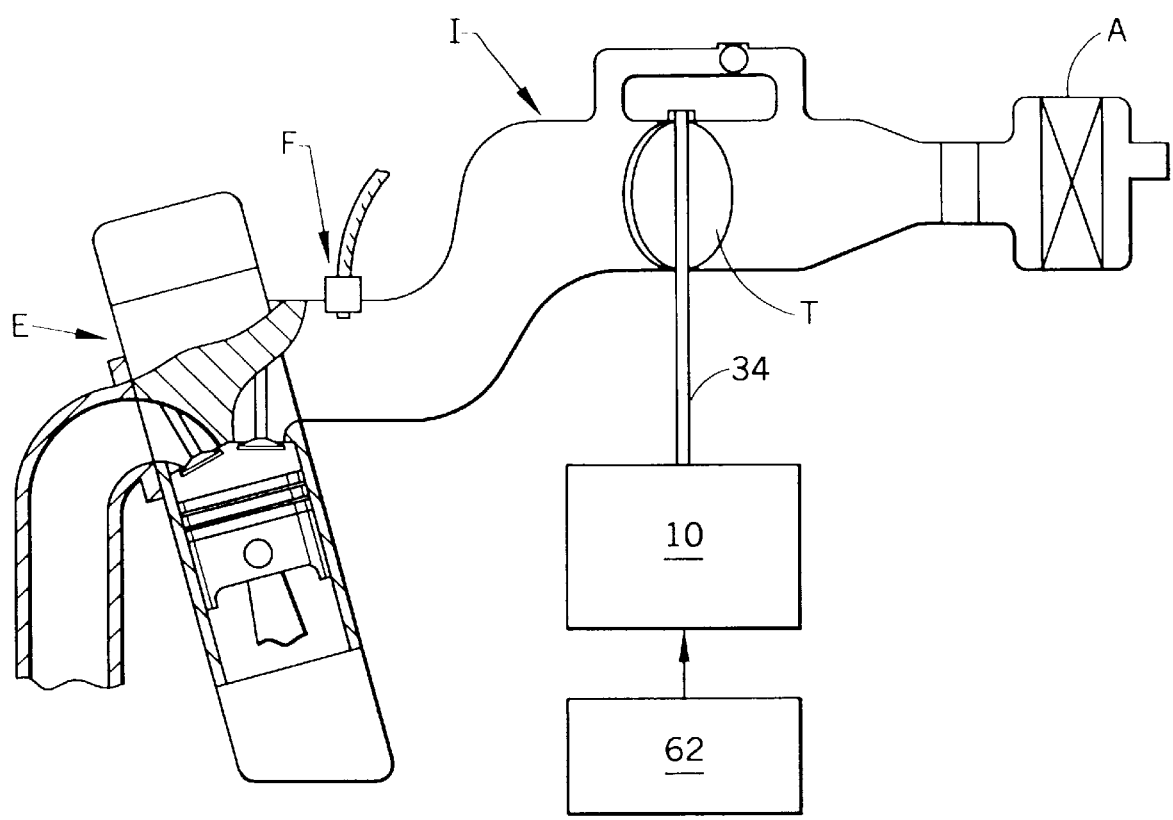
FIG. 3 is a simplified diagrammatic illustration of a motor vehicle internal combustion engine air intake system and associated electronic throttle control system.
Figure 5:
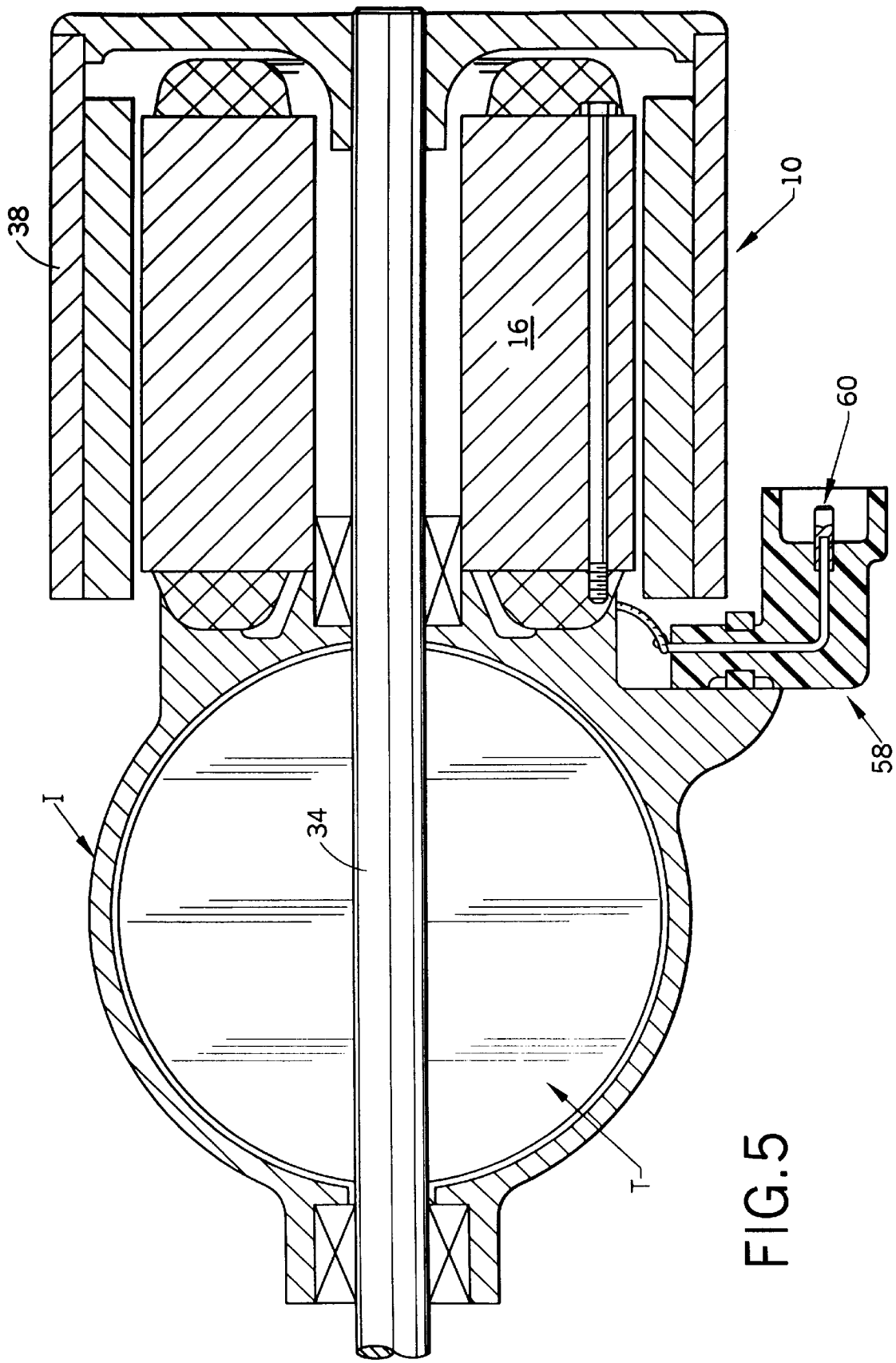

With reference to FIGS. 3 and 5, an electronic throttle control system for an internal combustion engine E is illustrated and includes an air/fuel intake passage or manifold I. Air enters the manifold I through an air filter A. The flow of air into and through the manifold I is controlled by a throttle plate valve T. The throttle plate valve T selectively blocks all air flow or is rotated a varying amount to allow a select airflow therepast into the internal combustion engine E. A fuel injector F selectively injects gasoline or other fuel into the air stream for combustion in the engine E.

The angular position of the throttle plate T is controlled by the torque motor 10. More particularly, the output shaft 34 of the motor 10 is connected with the throttle plate T so that the plate rotates therewith and with the rotor 38 of the motor 10. Those of ordinary skill in the art will recognize that if the throttle plate T is obstructed by ice or the like, the operator of the vehicle will be unable to control the position of the throttle plate, and thus the output of the internal combustion engine E.

Figure 4:
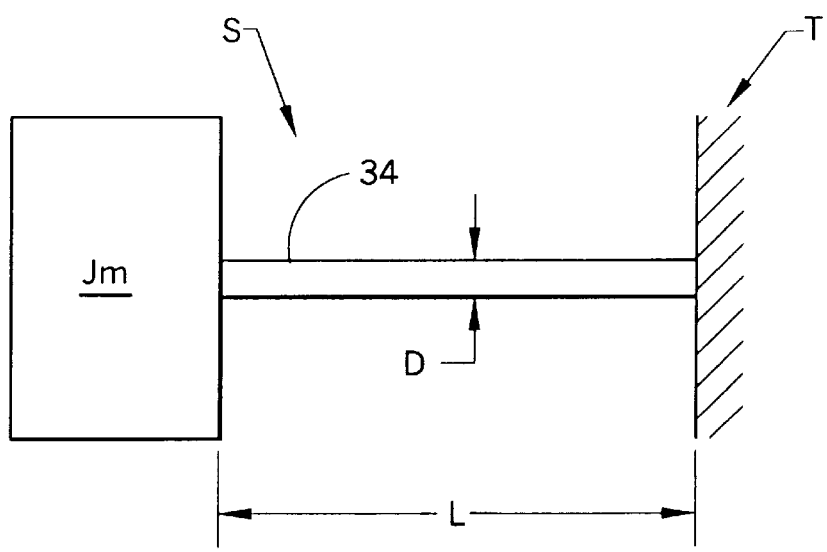
FIG. 4 is a schematic representation of the electronic throttle control system of FIG. 3 in the case where the throttle plate is seized by ice or another obstruction; and, FIG. 5 illustrates a throttle plate valve and associated torque motor in accordance with the invention.

The case where the throttle plate T is seized by ice or other obstruction is schematically illustrated as a mechanical system S in FIG. 4. The torque motor inertia $J_m$ is connected to the seized plate T via the shaft 34 having a select length L and diameter D. This mechanical system has a natural frequency that may be determined by conventional methods, for example, as follows:

$J_m$=Torque Motor Inertia

D=Diameter of the Shaft

L=Length of the Shaft

G=Modulus of the Shaft Material

The spring rate of the shaft is given by $$\frac{L}{JG} = k$$

where k is the spring rate.
The natural frequency is given by $$f = \frac{1}{2\Pi}\sqrt{\frac{k}{j}}$$

This is the frequency f at which the oscillating torque is applied to the rotor 38 by appropriate energization of the motor coils to create a resonant condition. In the case of the torque motor 10 described above, the natural frequency has been calculated to be 0.91 Hz.

In order to amplify the torque output by the motor 10 in accordance with the present invention, it has been deemed desirable to oscillate the motor at the natural frequency of the mechanical system S to create a resonant condition. More particularly, upon seizure of the throttle plate T, the controller 62 implements the torque amplification method in accordance with the present invention to energize the windings 40–46 so that a first clockwise or counter-clockwise torque is applied to the rotor 38. Because the throttle plate T is unable to move, the shaft 34 is twisted or "wound-up" in the manner of a spring. Thereafter, the controller 62 energizes the windings 40–46 so that the opposite direction torque is applied to the rotor 38. Consequently, the shaft 34 is twisted in the opposite direction. If this operation is repeated at the natural frequency F of the mechanical system S, assuming no dampening, the torque output by the motor 10 in the shaft 34 would reach infinity. In reality, dampening is provided by the bearing 14, the surrounding atmosphere, electromagnetic forces, and shaft hysteresis. These have been found to be insignificant for purposes of amplifying torque sufficiently to overcome an ice or other obstruction of a throttle plate T. For example, using the method of the present invention as described, it has been possible to amplify the normal operational torque output by the motor 10 by a factor of 5–10.

Although the invention has hereinabove been described with respect to the illustrated embodiments, it will be understood that the invention is capable of modification and variation and is limited only by the following claims.

Having thus described the preferred embodiments, the invention is now claimed to be:

1. A method of amplifying the torque output by an electric torque motor of a mechanical system from a normal operating torque to an amplified torque sufficient to overcome an obstruction preventing movement of a rotor of the torque motor, said method comprising:
    (a) applying one of a clockwise and a counter-clockwise direction torque to the rotor of the torque motor;
    (b) reversing the direction of torque applied to the rotor so that the other of the clockwise and counter-clockwise direction of torque is applied to the rotor;
    (c) repeating steps (a) and (b) in succession at a select frequency equal to a natural frequency of the mechanical system including the torque motor.

2. The method of amplifying the torque output by an electric torque motor as set forth in claim 1 further comprising, before step (a), determining the natural frequency of the mechanical system including the torque motor.

3. The method of amplifying the torque output by an electric torque motor as set forth in claim 1, wherein step (c) comprises repeating steps (a) and (b) in succession until the amplified torque output by the torque motor is at least five times greater than the normal operating torque.

4. The method of amplifying the torque output by an electric torque motor as set forth in claim 3, wherein step (c) comprises repeating steps (a) and (b) in succession until the amplified torque is in the range of approximately five to approximately ten times greater than the normal operating torque.

5. The method of amplifying the torque output by an electric torque motor as set forth in claim 3, wherein step (c) comprises repeating steps (a) and (b) in succession at a select frequency of approximately 0.91 Hertz.

6. The method of overcoming an obstruction preventing operative movement of a throttle plate connected to a rotor of an electric torque motor in a mechanical system by amplifying the torque output of said motor, said method comprising:
    applying torque to said rotor in first and second directions successively at a select frequency to oscillate the rotor at a natural frequency of the mechanical system until the torque output by the torque motor is amplified by resonance to overcome the obstruction.

7. The method as set forth in claim 6 wherein the operational torque of the torque motor is amplified by a multiple in the range of approximately five to approximately ten.

8. The method as set forth in claim 6 wherein the select frequency is approximately 0.91 Hertz.

9. A torque motor system comprising:
    a stator including a plurality of pole segments;
    a coil of electrically conductive material wound on each of the plurality of stator pole segments;
    a rotor formed of magnetically permeable material positioned to rotate relative to the stator and including permanently magnetized material defining magnetized poles so that, upon select energization of said coils, electromagnetically induced torque is applied to said rotor to rotate said rotor and components of a mechanical system connected to rotate with said rotor; and,
    a control system for selectively energizing said coils in accordance with a stored control program, said control system selectively energizing said coils so that torque is applied to said rotor in first and second opposite directions successively at a torque amplification frequency approximately equal to a natural frequency of the mechanical system.

10. The torque motor system as set forth in claim 9 wherein the torque amplification frequency is approximately 0.91 Hertz.

11. The torque motor system as set forth in claim 9 wherein said mechanical system comprises a throttle air flow control plate connected to rotate with said rotor by an output shaft.

* * * * *